Patented July 7, 1953

2,644,816

UNITED STATES PATENT OFFICE 2,644,816

PURIFICATION OF ANTIBIOTICS WITH WATER INSOLUBLE CARBOXYLIC ACIDS

William A. Lott, Maplewood, William Braker, Newark, and Andrew Ellis O'Keeffe, Woodbridge, N. J., assignors, by mesne assignments, to Mathieson Chemical Corporation, Baltimore, Md., a corporation of Virginia No Drawing. Application July 19, 1947, Serial No. 762,205

17 Claims. (Cl. 260—210)

1

This invention relates to basic antibiotics of the streptomycin type, i. e., to members of the genus composed of streptomycin and antibiotically-active basic compounds which, like streptomycin, are capable of forming water-soluble salts with acids such as sulfuric and water-insoluble salts with organic-base-precipitating reagents (e. g., derivatives of streptomycin, such as dihydrostreptomycin, and similarly-acting antibiotics, such as streptothricin).

In 1944, Schatz, Bugie, and Waksman (Proc. Soc. Exp. Biol. Med. 1944, 57, 244) showed that a potent antibiotic, termed "streptomycin", was formed during the growth of the organism Actinomyces griseus (now called Streptomyces griseus); and this antibiotic has since been demonstrated to be of high clinical utility.

It was later found that a number of streptomycins are formed at the same time. The first streptomycin obtained in pure crystalline form (as a reineckate) and fully characterized (Wintersteiner and Fried application, Serial No. 666,541, filed May 1, 1946, now Patent No. 2,501,014, dated March 21, 1950) is now referred to as "streptomycin A"; and the second streptomycin characterized (Fried and Titus application, Serial No. 737,400, filed March 26, 1947, now Patent No. 2,565,653, dated August 28, 1951) is now referred to as "streptomycin B." Moreover, there are indications that still other streptomycins are formed at the same time and/or may be formed at the same time by changes in the culture conditions; and it is intended that each of such antibiotics and any mixtures thereof (whether in the form of the free base or water-soluble salt thereof) be comprehended by the term "streptomycin" when employed unmodified hereinafter.

Streptomycin has been purified heretofore by various methods, all of which were complex and/or inefficient (and consequently expensive). For example, a method widely employed prior to this invention essentially comprised the following steps: (1) treating a primary streptomycin-containing liquid with an activated charcoal, which selectively adsorbs the streptomycin; (2) eluting the streptomycin from the charcoal with an aqueous, water-soluble mineral acid, preferably at a slightly elevated temperature (say about 30–50° C.); (3) treating the eluate with an organic-base precipitating reagent, preferably phosphotungstic acid; and (4) decomposing the precipitate. [The term "primary streptomycin-containing liquid" comprehends, inter alia: (a) the culture liquid obtained by growing Strep-

2 tomyces griseus under conditions and in a medium suitable for the production of streptomycin and removing the solids from the medium; (b) the culture liquid of enhanced potency obtained by acidification of such culture (with hydrochloric or sulfuric acid, for example), neutralized; and (c) the liquid obtained by acid-extraction of the solids separated from such culture, neutralized.]

It is the object of this invention to provide simple, efficient, and otherwise advantageous methods of purifying basic antibiotics of the streptomycin type—especially streptomycin; and it is a further object of this invention to provide certain salt-type derivatives of basic antibiotics of the streptomycin type useful in these purification methods and for other purposes, and methods of preparing these derivatives.

The methods of this invention essentially comprise intimately contacting an aqueous solution of a basic antibiotic of the streptomycin type (especially streptomycin) with a substantially water-insoluble carboxylic acid (preferably, with a higher fatty acid, and notably with lauric acid) and a substantially water-immiscible organic solvent for the carboxylic acid (preferably, with a substantially water-immiscible aliphatic alcohol, and notably with amyl alcohol mixtures); and the purification methods of this invention essentially comprise intimately contacting an aqueous solution of an impure basic antibiotic of the streptomycin type (e. g., a primary streptomycin-containing liquid, or an aqueous solution of a partially-purified streptomycin, such as the eluate referred to hereinbefore) with a substantially water-insoluble carboxylic acid and a substantially water-immiscible organic solvent for the carboxylic acid, recovering the organic solvent phase, and converting the salt-type derivative of the antibiotic therein into a water-soluble salt of the antibiotic, preferably by intimately contacting the organic solvent solution with an aqueous, water-soluble, relatively-strong acid (especially with an aqueous, water-soluble, relatively-strong mineral acid), separating the aqueous phase, and recovering the salt therein. The water-soluble salt of the antibiotic thus obtained is considerably purified, and the recovery of antibiotic activity in the impure-antibiotic solution treated is of a high order. By the practice of this invention it is possible to obtain yields of purified streptomycin (for example) having a potency above about 400 units/mg. which are uniformly high.

The substantially water-insoluble carboxylic acids utilizable in the practice of this invention include, inter alia: aliphatic acids, such as lauric, 2-ethyl-hexoic, sorbic, mucic, caprylic, palmitic, stearic, and oleic acids—especially coconut-oil fatty acids, palm-kernel fatty acids, or other technical lauric acids (i. e., mixtures of fatty acids having an average molecular weight approximating that of lauric acid); aromatic acids, such as benzoic, phenylacetic, p-amino-benzoic, 3,5-dinitro-benzoic, cinnamic and α-decyl cinnamic; cycloaliphatic acids, such as camphoric and naphthenic; and heterocyclic acids, such as indoleacetic and furoic.

The substantially water-immiscible organic solvents for the carboxylic acid utilizable in the practice of this invention include, inter alia: aliphatic alcohols, such as n-amyl alcohol (1-pentanol), n-butanol (1-butanol), methyl isopropyl carbinol, methyl-isobutyl carbinol, isobutyl carbinol, 2-ethyl-hexanol, and amyl alcohol mixtures, such as refined fermentation-amyl-alcohol; aliphatic alcohol esters of lower fatty acids, such as the acetate of methyl isobutyl carbinol; aliphatic ketones, such as methyl iso-butyl ketone; aliphatic ethers, such as di-n-butyl ether and diethyl ether; hydrocarbons, such as benzene and toluene, and halogenated hydrocarbons, such as chloroform and ethylene dichloride.

Among the water-soluble, relatively-strong acids utilizable for recovery of the streptomycin from the organic solvent solution are sulfuric, hydrochloric, phosphoric, oxalic, citric, sulfamic, and nitric.

In one embodiment of the invention, a culture filtrate containing a basic antibiotic of the streptomycin type is intimately contacted with a solution of a substantially water-insoluble carboxylic acid in a substantially water-immiscible organic solvent therefor, the organic solvent phase is recovered, the organic solvent solution is intimately contacted with an aqueous water-soluble, relatively-strong acid, and the aqueous phase is recovered and dried, preferably freeze-dried (i. e., frozen, and subjected to a high vacuum to sublime off the water). Alternatively, the intimate contact between the antibiotic solution, carboxylic acid, and organic solvent may be effected by first mixing the antibiotic solution with the carboxylic acid (preferably in aqueous suspension), and then intimately contacting the mixture with the organic solvent; or by first mixing the antibiotic solution with the organic solvent, and then intimately contacting the mixture with the carboxylic acid.

Preferably, especially when the aqueous solution of impure antibiotic treated is a culture filtrate, the organic solvent solution obtained is washed with water before treatment with the aqueous acid, the wash removing a considerable amount of inactive solids but practically none of the antibiotic.

The distribution coefficient of the antibiotic between the organic solvent phase (solution of the carboxylic acid) and the aqueous phase is dependent upon pH. Thus, when using a refined fermentation amyl alcohol solution of coconut-oil fatty acids in the treatment of an aqueous solution of streptomycin, maximum transference of streptomycin from the aqueous phase (as well as minimum transference of alkali soaps to the amyl alcohol phase) is obtained when the pH of the aqueous phase is adjusted to between about 6 and about 10, especially between about 6.5 and about 8.5 (a transference of over 99% having thus been obtained from an aqueous solution of a streptomycin hydrochloride having a potency of 422 units/mg. and contaminated with pyrogens, histamine-like substances, and streptidine). Other factors being equal, the pH should desirably be higher in the range specified as the purity of the antibiotic solution is lower.

Where the carboxylic acid employed is in liquid form (as in the case of 2-ethyl-hexoic or oleic acid), the organic solvent component may be dispensed with, an excess of the acid functioning as the organic solvent component. A separate organic solvent component may also be dispensed with when using an excess of a low-melting carboxylic acid (or low-melting mixture of carboxylic acids) and operating at a suitably elevated temperature (high enough to liquefy the acid or mixture of acids, but below that at which the antibiotic is destroyed).

Alternatively, the salt-type combination of the antibiotic and the carboxylic acid may be recovered from its solution in the organic solvent and then converted into a water-soluble salt, or used as a therapeutic agent per se. Thus, the salt-type derivative of the antibiotic may be recovered by evaporating off the organic solvent in vacuo, or (where the organic solvent lends itself to such procedure, as in the case of benzene, for example, by freeze-drying the solution). Alternatively, the salt-type derivative of the antibiotic may be obtained more directly by interacting a basic antibiotic of the streptomycin type with a water-soluble salt of a substantially water-insoluble carboxylic acid, in an aqueous medium, as described and claimed in our application Serial No. 762,206 filed of even date herewith (now Patent No. 2,631,143, dated March 10, 1953). These salt-type derivatives of antibiotics are, in general, oil-soluble or oil-dispersible; and they may be used therapeutically, e. g., orally administered either per se or in oily media for the treatment of intestinal disorders (relying on intestinal processes to liberate the antibiotic in water-soluble form) or parenterally administered in oily media for prolonged antibiotic action. Where production of the salt-type derivative of the antibiotic—rather than purification of the antibiotic—is the objective, one may employ a reconstituted aqueous solution of the antibiotic (e. g., an aqueous solution of the highly purified or pure antibiotic).

The various extractions involved in the methods of this invention may of course be carried out by the countercurrent technique; and the spent solutions and/or extracts may be re-employed in the method for further removal of activity and/or concentration of the extracted material. Thus, the spent antibiotic-containing liquid may be extracted with a fresh batch of carboxylic acid and organic solvent; the spent organic solvent may be extracted with a fresh batch of aqueous, water-soluble, relatively-strong acid, or such solvent may be used on a fresh batch of antibiotic-containing liquid; and/or the aqueous acid extract may be used to treat a fresh batch of organic solvent solution, to build up the antibiotic concentration therein.

The amount of carboxylic acid employed should desirably be sufficient to combine with all of the antibiotic in the solution treated, and preferably should be in excess.

The following examples are illustrative of the invention (all solutions or dilutions referred to without identification of the solvent or diluent being solutions in, or dilutions with, water):

EXAMPLE 1

(a) 7.5 liters of a streptomycin-containing culture filtrate (obtained, for example, by growing *Streptomyceus griseus* in submerged culture in an aqueous medium containing soybean meal, dextrose, and sodium chloride, acidifying the incubated culture, and filtering), having a potency of 280 units/ml., is intimately contacted with a solution of 67.5 g. coconut-oil fatty acids in 750 ml. refined fermentation-amyl-alcohol. The pH of the aqueous phase is then adjusted to 6.9 by adding 25% NaOH solution while stirring well (about 10 ml. being required). The mixture is then centrifuged, and the amyl alcohol layer formed (about 335 ml.) is recovered; it has a streptomycin potency of about 1,520 units/ml., and hence contains about 25% of the activity of the culture filtrate.

(b) 50 ml. of the amyl alcohol solution is intimately contacted with 50 ml. water; the pH of the aqueous phase is adjusted to 3.4 by adding to the mixture 10% hydrochloric acid (about 1.4 ml. being required); and the aqueous layer (about 52 ml.) is separated. The amyl alcohol solution is then intimately contacted with a second 50 ml. portion of water, and the pH of the aqueous phase adjusted to 2.85 by addition of 10% hydrochloric acid (about 0.7 ml. being required); and the aqueous layer formed (about 50 ml.) is separated. The aqueous layers are then combined, neutralized to pH 5.85 with 10% sodium hydroxide solution, and freeze-dried. The streptomycin hydrochloride thus obtained in a yield of about 0.26 g. has a potency of about 344 units/mg. (the recovery from the amyl alcohol solution being therefore practically quantitative).

EXAMPLE 2

(a) 14 liters of a streptomycin-containing culture filtrate (potency, 305 units/ml.) is intimately contacted with a solution of 103 g. coconut-oil fatty acids in 2.2 liters refined fermentation-amyl-alcohol. The pH of the aqueous phase is then adjusted to 7.20± 0.05 by adding 20% sodium hydroxide solution, while stirring well (about 37 ml. being required); the mixture is centrifuged; and the amyl alcohol layer formed (about 1,385 ml.) is recovered; it has a streptomycin potency of about 1,500 units/ml., and hence contains about 52% of the activity of the culture filtrate.

Re-extraction of the partially-spent culture filtrate with a solution of 80 g. coconut-oil fatty acids in 1.02 liters refined fermentation-amyl-alcohol (with adjustment of pH to 7.3 by addition of about 13 ml. 20% sodium hydroxide solution) yields an additional amyl alcohol solution (about 935 ml.) having a streptomycin potency of about 820 units/ml. (bringing the total recovery to about 77% of the activity of the culture filtrate).

(b) 1.4 liters of the first-obtained amyl alcohol solution (potency 1,500 units/ml.) is washed by intimately contacting it with 400 ml. distilled water and separating the aqueous layer, the wash removing a considerable amount of inactive solids, but practically no streptomycin. The washed amyl alcohol solution is then intimately contacted with another 400 ml. portion of water, and 70 ml. normal hydrochloric acid is added (bringing the pH of the aqueous phase to about 2.1); and the amyl alcohol layer formed on separation of the phases is further extracted with a 200 ml. and then a 100 ml. portion of water. The three aqueous extracts are combined, washed once by shaking with 100 ml. ether, treated with 1 g. of a decolorizing carbon (e. g., Darco G–60), filtered, neutralized to pH 5.8 by addition of normal sodium hydroxide solution (about 14 ml. being required), and freeze-dried. The streptomycin hydrochloride thus obtained in a yield of about 5.48 g. has a potency of about 494 units/mg. (the recovery from the amyl alcohol solution being therefore practically quantitative).

For brevity, the details of other examples procedurally analogous to Examples 1 and 2 but illustrating variations of the invention are given hereinafter in tabular form (Table 1), the organic-solvent solution obtained being further treated as described hereinbefore, e. g., in section b of Example 2, to obtain a streptomycin hydrochloride.

Table I

| Example No. | Quantity of streptomycin hydrochloride-containing solution treated, and potency | Organic solvent used, and quantity | Carboxylic acid used (dissolved in organic solvent), and quantity | pH adjusted (with 20% sodium hydroxide solution) to— | Approximate percentage recovery of original activity |
|---|---|---|---|---|---|
| 3 | 1 liter (2.35 g. solids), 422 units/mg. | refined fermentation amyl alcohol, 1 liter. | caprylic acid, 43.2 g | 7.15–7.61 | 95 |
| 4 | do | do | palmitic acid, 76.8 g | 7.5 | 97 |
| 5 | 1 liter, 2,080 units/ml | 2-ethyl-hexoic acid, 65 g | 2, ethyl-hexoic acid, 65 g | 6.35 | 75 |
| 6 | 100 ml., 900 units/ml | refined fermentation amyl alcohol, 100 ml. | lauric acid, 6.22 g | 7.55 | 90 |
| 7 | 100 ml., 940 units/ml | n-butanol, 100 ml | coconut oil fatty acids, 6.22 g. | 6.8 | 85 |
| 8 | do | methyl-isobutyl carbinol, 100 ml. | do | 7.4 | 55 |
| 9 | do | 2-ethyl-hexanol, 100 ml | do | 7.7 | 70 |
| 10 | do | di-n-butyl ether, 100 ml | do | 7.1 | 30 |

EXAMPLE 11

(a) 1 g. of an aqueous suspension of benzoic acid is added to 10 ml. of a solution of partially-purified streptomycin sulfate (potency, 6,550 units/ml.), followed by 10 ml. ether; the pH is adjusted to 7–10 with dilute sodium hydroxide solution; the mixture is shaken for five minutes; and the ether layer formed is separated. About 40% of the activity is extracted into the ether layer.

Under identical conditions, but using the following other carboxylic acids (i. e., 1 g. of an aqueous suspension thereof), the indicated approximate percentage of activity was extracted into the ether: p-amino-benzoic acid (50); 3,5-dinitro-benzoic acid (60); sorbic acid (40); and cinnamic acid (50).

(b) The ether solution is treated (e. g., by the procedure described in Example 1 or 2) to obtain streptomycin hydrochloride (or other water-soluble salt of streptomycin).

EXAMPLE 12

(a) 24 g. of oleic acid is added to 2.65 liters of a streptomycin-hydrochloride-containing eluate having a potency of 556 units/ml. (obtained by treating a primary streptomycin-containing liquid with an activated charcoal, and eluting the streptomycin from the charcoal with dilute hydrochloric acid), followed by 530 ml. refined fermentation-amyl-alcohol; the mixture is adjusted to pH 10 by addition of dilute sodium hydroxide solution, and stirred for 10 minutes; and the amyl alcohol layer formed on separation (containing about 90% of the activity of the eluate) is recovered.

(b) The amyl alcohol solution is extracted with dilute sulfuric acid in two fractions. First, the dilute sulfuric acid is added gradually while agitating until the pH (originally about 9.6) reaches 6.5; the aqueous layer formed (first extract) is separated; and a second extract is obtained by continuing the addition of dilute sulfuric acid until the pH reaches 1.9. On freeze-drying, the first extract yields about 4.5 g. streptomycin sulfate having a potency of about 163 units/mg. (representing a recovery of about 55.3%); and the second extract, on adjustment to pH 6.2 with dilute sodium hydroxide solution and freeze-drying, yields about 1.1 g. streptomycin sulfate having a potency of about 321 units/mg. (and representing a recovery of about 25.8%, the total recovery being therefore about 81.1%.

EXAMPLE 13

(a) One liter of refined fermentation-amyl-alcohol is added to 7 liters of streptomycin-hydrochloride-containing eluate (potency, 425 units/ml.), followed by 54 g. of oleic acid; and the mixture is stirred while adding dilute sodium hydroxide solution until the pH reaches 10. The mixture is then stirred for an additional 5 minutes; and the amyl alcohol layer formed on separation (containing about 94.7% of the activity of the eluate) is recovered.

(b) The amyl alcohol solution is extracted 3 times by shaking 215 ml. portions of dilute sulfuric acid; and the three extracts are combined, neutralized with barium hydroxide solution, and filtered; and the filtrate is freeze-dried. The streptomycin sulfate thus obtained has a potency of about 324 units/mg., the recovery from the amyl alcohol solution being about 61.5%.

For brevity, the details of other examples procedurally analogous to Example 13 but illustrating further variations of the invention are given hereinafter in tabular form (Table II).

ous phase is adjusted to 6.7 by addition of dilute sodium hydroxide solution; and the amyl alcohol layer formed on centrifugation (about 2.5 liters, containing over about 50% of the original activity) is recovered.

(b) The amyl alcohol solution is washed four times, each time with one-fourth its volume distilled water (inorganic salts and organic bases weaker than streptomycin being removed by the washes, without materially reducing the streptomycin content of the amyl alcohol). The washed amyl alcohol solution is then extracted with one-fourth the volume of third-normal sulfuric acid, and then with two portions of distilled water, each one-fourth the volume of the amyl alcohol solution; the three extracts are combined and washed with one-fourth their combined volume of fresh amyl alcohol (to remove any entrained lauric acid); the washed extract (whose pH is about 3.5) is separately treated with three portions of an adsorbent carbon (e. g., Darco G-60), 0.5 g. carbon per million units streptomycin in the extract being used for each portion. The extract, which has thus been rendered practically water-white, is adjusted to pH 5.5–6.0 by addition of barium hydroxide solution; and after standing several hours, the extract is filtered to remove precipitated barium sulfate, partially concentrated at low temperature in vacuo, and freeze-dried. The streptomycin sulfate thus obtained in a yield of about 12 g. has a potency of about 400 units/mg.

The following variations (either singly or severally) may be made in the foregoing example without material effect on recoveries: the lauric acid may be replaced by a middle cut of distilled coconut-oil fatty acids; the amount of acid used may be lowered to 200 g.; and the pH of the aqueous phase may be adjusted (by addition of a dilute solution of an alkali) to any other value within the range about 6.0 to about 8.0. Also, the spent culture filtrate (after extraction of 50% of the activity into the amyl alcohol phase) may be re-extracted with half the quantities of the amyl alcohol and lauric acid used for the first extraction, about half the streptomycin remaining in the culture filtrate being thus removed (and the extraction may be repeated as many times as economically feasible); and the

*Table II*

| Example No. | Quantity of streptomycin-hydrochloride-containing eluate treated, and potency | Organic solvent added, and quantity | Carboxylic acid added, and quantity | pH adjusted with dilute sodium hydroxide solution to— | Approximate percentage of eluate activity in organic solvent solution | Data on product obtained by extraction of the organic solvent solution with dilute sulfuric acid, neutralization, filtration and freeze-drying, as described in section (b) of Example 13 | |
|---|---|---|---|---|---|---|---|
| | | | | | | Approximate potency, units/mg. | Approximate recovery from organic solvent solution |
| 14 | 500 ml., 750 units/ml | acetate of methyl isobutyl carbinol, 100 ml. | oleic acid, 13.74 g | 8.5 | 87 | 175 | 75 |
| 15 | 500 ml., 625 units/ml | benzene, 100 ml | oleic acid, 10.9 g | 8.5 | 96 | 210 | 85 |
| 16 | 500 ml., 414 units/ml | chloroform, 100 ml | do | 10 | 91.3 | 235 | 76 |
| 17 | 500 ml., 537 units/ml | n-butanol, 100 ml | do | 10 | 77.6 | 192 | 68 |
| 18 | 500 ml., 618 units/ml | ethylene dichloride, 100 ml. | do | 8.5 | 97.2 | 250 | 88 |

EXAMPLE 19

(a) 25 liters of a streptomycin-containing culture filtrate (potency, 400 units/ml.) is mixed with 5 liters refined fermentation-amyl-alcohol containing 600 g. lauric acid; the pH of the aqueous phase is adjusted to 6.7 by addition of dilute thus-extracted streptomycin may be recovered as streptomycin sulfate in the same manner as from the first extract, the product obtained being of substantially the same quality as that obtained from the first extract.

EXAMPLE 20

25 liters of a streptomycin-containing culture filtrate is mixed with 5 liters refined fermentation-amyl-alcohol containing 60 g. oleic acid for each million units streptomycin in the culture filtrate; the mixture is adjusted to pH 6.7 by adding sodium hydroxide solution, while stirring; the mixture is stirred for an additional 10 minutes; and the amyl alcohol phase is recovered by centrifugation. (Re-extractions of the spent culture filtrate remove additional quantities of streptomycin.)

Treatment of the amyl alcohol solution as described hereinbefore to obtain streptomycin sulfate yields a product having a potency over about 400 units/mg.

EXAMPLE 21

0.5 g. dihydrostreptomycin hydrochloride, having a potency of 528 units/mg., is dissolved in 500 ml. water; the aqueous solution is mixed with a solution of 15 g. coconut-oil fatty acids in 100 ml. of a commercial mixture of synthetic amyl alcohols (e. g., Pentasol); and the pH is adjusted to between 6.8 and 7.5 by addition of 20% aqueous sodium hydroxide solution in small increments, while stirring well. The amyl alcohol layer, separated by centrifugation, contains over about 80% of the activity of the aqueous solution treated.

The amyl alcohol solution is then treated, as described hereinbefore, either to obtain the salt-type derivative of dihydrostreptomycin per se, or to convert it into a purified water-soluble salt of dihydrostreptomycin.

EXAMPLE 22

21.2 mg. streptothricin hydrochloride, having a potency of 500 units/mg. is dissolved in 21.2 ml. water; the aqueous solution is mixed with 12.7 ml. of a 20% solution of coconut-oil fatty acids in a commercial mixture of synthetic amyl alcohols (e. g., Pentasol); and the mixture is adjusted to a pH of 6.5 to 7.1 by addition of normal sodium hydroxide solution, while stirring. The separated amyl alcohol layer contains over about 87% of the activity of the aqueous solution treated.

The amyl alcohol solution is then treated, as described hereinbefore, either to obtain the salt-type derivative of streptothricin per se, or to convert it into a purified water-soluble salt of streptothricin.

EXAMPLE 23

A streptomycin-containing culture filtrate having a potency of 199 units/ml. is mixed with 4% of its volume of refined fermentation-amyl-alcohol, and then extracted by a three-stage countercurrent extraction with about one-seventh its volume of a solution of lauric acid in refined fermentation-amyl-alcohol, the ratio of lauric acid to culture filtrate being 8 g./liter, and the pH of the aqueous phase being adjusted continuously to 8.4 by addition of potassium hydroxide solution. The amyl alcohol layer, separated by centrifugation, has a potency of about 1390 units/ml. (representing an extraction of about 93% of the activity of the culture filtrate).

The amyl alcohol solution is then treated, as described hereinbefore, either to obtain the salt-type derivative of streptomycin per se, or to convert it into a purified water-soluble salt of streptomycin.

Among other basic antibiotics of the streptomycin type utilizable for the preparation of salt-type combinations with substantially water-insoluble carboxylic acids in accordance with this invention are pure (or substantially pure) streptomycin A, streptomycin B, dihydrostreptomycin A, and dihydrostreptomycin B.

The basic antibiotic of the streptomycin type purified by the method of this invention may be further purified by repetition of the same purification method. Also, it may be preliminarily purified or further purified by any other method, especially by one of the following: (I) treating an aqueous solution of the antibiotic with a water-soluble salt of a substantially water-insoluble carboxylic acid, recovering the precipitated salt-type combination of the antibiotic and the carboxylic acid, and converting it into a water-soluble salt of the antibiotic (cf. application Serial No. 762,206 filed of even date herewith); (II) intimately contacting an aqueous solution of the antibiotic with a surface-active agent of the organically-substituted polybasic-inorganic-acid type, recovering the precipitated salt-type combination of the antibiotic and the surface-active agent, and converting it into a water-soluble salt of the antibiotic (cf. application Serial No. 767,852 filed August 9, 1947, now Patent No. 2,537,934, dated January 9, 1951; and (III) intimately contacting an aqueous solution of the antibiotic with a surface-active agent of the organically-substituted polybasic-inorganic-acid type and a substantially water-immiscible organic solvent for soaps, recovering the organic solvent phase, and converting the salt-type derivative of the antibiotic therein into a water-soluble salt of the antibiotic (cf. application Serial No. 767,851, filed August 9, 1947, now Patent No. 2,537,933, dated January 9, 1951).

In the extraction of the organic solvent solution (of the salt-type combination of antibiotic and carboxylic acid) with the aqueous, water-soluble, relatively-strong acid, a yellowish impurity is generally transferred to the aqueous phase along with the streptomycin. When the extraction is modified, as illustrated by the following example, most of the yellowish impurity remains in the organic solvent phase: 1600 ml. of an amyl alcohol solution of a salt-type combination of streptomycin and coconut-oil fatty acids, obtained as described in section $a$ of Example 2 and having a potency of 1175 units/ml., is extracted with three separate 400 ml. portions of 0.1 molar disodium phosphate solution, phosphoric acid being added to each extraction mixture until the pH of the aqueous phase is 6.60±0.02. After combining the three extracts and concentrating to remove solvent, their total volume is about 950 ml., and the potency is about 1412 units/ml., indicating that about 70% of the streptomycin activity of the organic solvent solution has been transferred to the aqueous phase. The thus obtained aqueous streptomycin solution containing buffer salts may be further purified by repetition of the (carboxylic acid-organic solvent) purification method of this invention.

The invention may be variously otherwise embodied within the scope of the appended claims.

We claim:

1. The method which comprises intimately contacting an aqueous solution of an antibiotic of the group consisting of streptomycin, dihydrostreptomycin, streptothricin, and water-soluble salts of these with a substantially water-insoluble carboxylic acid and a substantially water-immiscible organic solvent for the carboxylic acid.

2. The method of purifying an antibiotic of the group consisting of streptomycin, dihydrostreptomycin, streptothricin, and water-soluble salts of these, which comprises intimately contacting an aqueous solution of the impure antibiotic with a substantially water-insoluble carboxylic acid and a substantially water-immiscible organic solvent for the carboxylic acid, recovering the organic solvent phase, and converting the salt-type derivative of the antibiotic therein into a water-soluble salt of the antibiotic.

3. The method which comprises intimately contacting an aqueous solution of a water-soluble salt of streptomycin with a higher fatty acid and a substantially water-immiscible organic solvent for the acid.

4. The method which comprises intimately contacting an aqueous solution of a water-soluble salt of streptomycin with lauric acid and a substantially water-immiscible organic solvent for the acid.

5. The method which comprises intimately contacting an aqueous solution of a water-soluble salt of streptomycin with a substantially water-insoluble carboxylic acid and a substantially water-immiscible aliphatic alcohol.

6. The method which comprises intimately contacting an aqueous solution of a water-soluble salt of streptomycin with a substantially water-insoluble carboxylic acid and refined fermentation-amyl-alcohol.

7. The method of purifying streptomycin, which comprises intimately contacting a primary streptomycin-containing liquid with a substantially water-insoluble carboxylic acid and a substantially water-immiscible organic solvent for the carboxylic acid, recovering the organic solvent phase, intimately contacting the organic solvent solution with an aqueous, water-soluble, relatively-strong acid, and recovering the aqueous phase.

8. The method of purifying streptomycin, which comprises treating a primary streptomycin-containing liquid with an activated charcoal, eluting the streptomycin from the charcoal with an aqueous, water-soluble mineral acid, intimately contacting the eluate with a substantially water-insoluble carboxylic acid and a substantially water-immiscible organic solvent for the carboxylic acid, recovering the organic solvent phase, intimately contacting the organic solvent solution with an aqueous, water-soluble, relatively-strong acid, and recovering the aqueous phase.

9. The method which comprises intimately contacting an aqueous solution of a water-soluble salt of streptomycin with a solution of a substantially water-insoluble carboxylic acid in a substantially water-immiscible organic solvent.

10. The method which comprises first mixing an aqueous solution of a water-soluble salt of streptomycin with an aqueous suspension of a substantially water-insoluble carboxylic acid, and then intimately contacting the mixture with a substantially water-immiscible organic solvent for the carboxylic acid.

11. The method which comprises first mixing an aqueous solution of a water-soluble salt of streptomycin with a substantially water-immiscible organic solvent for substantially water-immiscible carboxylic acids, and then intimately contacting the mixture with a substantially water-immiscible carboxylic acid.

12. The method of purifying streptomycin, which comprises intimately contacting an aqueous solution of an impure water-soluble salt of streptomycin with a substantially water-insoluble carboxylic acid and a substantially water-immiscible organic solvent for the carboxylic acid, the pH of the aqueous phase being adjusted to between about 6 and about 10, recovering the organic solvent phase, intimately contacting the organic solvent solution with an aqueous, water-soluble, relatively-strong acid, and recovering the aqueous phase.

13. The method which comprises intimately contacting an aqueous solution of water-soluble salt of streptomycin with an excess of a substantially water-insoluble carboxylic acid in liquid form.

14. The method which comprises intimately contacting an aqueous solution of a water-soluble salt of streptomycin with an excess of 2-ethyl-hexoic acid.

15. The method which comprises intimately contacting an aqueous solution of an antibiotic of the group consisting of streptomycin, dihydrostreptomycin, streptothricin, and water-soluble salts of these with a substantially water-insoluble carboxylic acid and a substantially water-immiscible organic solvent for the carboxylic acid, separating the organic solvent phase, and recovering the salt-type combination of the antibiotic and the carboxylic acid from its solution in the organic solvent.

16. The method which comprises intimately contacting an aqueous solution of a member of the group consisting of streptomycin and a water-soluble salt thereof with a substantially water-insoluble fatty acid and a substantially water-immiscible alcoholic solvent containing from 4 to 6 carbon atoms.

17. The method of purifying streptomycin which comprises intimately contacting an aqueout solution of an impure member of the group consisting of streptomycin and water-soluble salts thereof with a substantially water-insoluble fatty acid and a water-immiscible alcoholic solvent containing from 4 to 6 carbon atoms, recovering the alcoholic solvent phase, and converting the salt-type derivative of streptomycin therein into a water-soluble salt of streptomycin.

WILLIAM A. LOTT.
WILLIAM BRAKER.
ANDREW ELLIS O'KEEFFE.

References Cited in the file of this patent

UNITED STATES PATENTS

| Number | Name | Date |
|---|---|---|
| 2,139,839 | Mckinney | Dec. 13, 1938 |
| 2,481,267 | Walti | Sept. 6, 1949 |
| 2,501,014 | Wintersteiner et al. | Mar. 21, 1950 |

OTHER REFERENCES

McElvain, "Characterization of Organic Compounds," 1945, page 64, 1 page.

Fried et al., Science, v. 101 (1945), pages 613–615, 3 pages.

Kuehl et al., Science, v. 102 (1945), pages 34–35, 2 pages.

Kolmer et al., Science, v. 104 (1946), pages 315–317, 3 pages.